United States Patent [19]

Paschke et al.

[11] Patent Number: 4,904,046
[45] Date of Patent: Feb. 27, 1990

[54] PROCESS OF AND APPARATUS FOR LEADING AN OPTICAL WAVEGUIDE THROUGH A WALL VIA A HERMETIC SEAL

[75] Inventors: Hartmut Paschke, Ergolding; Gerd Kreutzmann, Landshut; Hrabanus Hack, Mainz, all of Fed. Rep. of Germany

[73] Assignee: Schott Glaswerke, Mainz, Fed. Rep. of Germany

[21] Appl. No.: 320,639

[22] Filed: Mar. 8, 1989

[30] Foreign Application Priority Data

Mar. 8, 1988 [DE] Fed. Rep. of Germany ....... 3807491

[51] Int. Cl.$^4$ .................................................. G02B 6/36
[52] U.S. Cl. ................................. 350/96.20; 350/320; 357/74
[58] Field of Search ............... 350/96.15, 96.18, 96.20, 350/96.21, 96.22, 96.29, 320; 357/74, 80, 81

[56] References Cited

U.S. PATENT DOCUMENTS

| | | | |
|---|---|---|---|
| 4,119,363 | 10/1978 | Camlibel et al. | 350/96.20 |
| 4,357,072 | 11/1982 | Goodfellow et al. | 350/96.20 |
| 4,708,429 | 11/1987 | Clark et al. | 350/96.20 |

FOREIGN PATENT DOCUMENTS

| | | | |
|---|---|---|---|
| 0274222 | 7/1988 | European Pat. Off. | |
| 55-22711 | 2/1980 | Japan | 350/96.21 |
| 55-22712 | 2/1980 | Japan | 350/96.20 |
| 63-300205 | 12/1988 | Japan | 350/96.20 |

Primary Examiner—John D. Lee
Attorney, Agent, or Firm—Millen, White & Zelano

[57] ABSTRACT

To lead an optical waveguide through a housing wall, the optical waveguide is, in one section freed of its protective layer and hermetically connected in a bushing by glass soldering it to the bushing. In at least one load-relieving section leading out of the bushing, the optical waveguide is fastened by its protective layer to an extension of the bushing. The bushing is hermetically set into the housing wall.

15 Claims, 2 Drawing Sheets

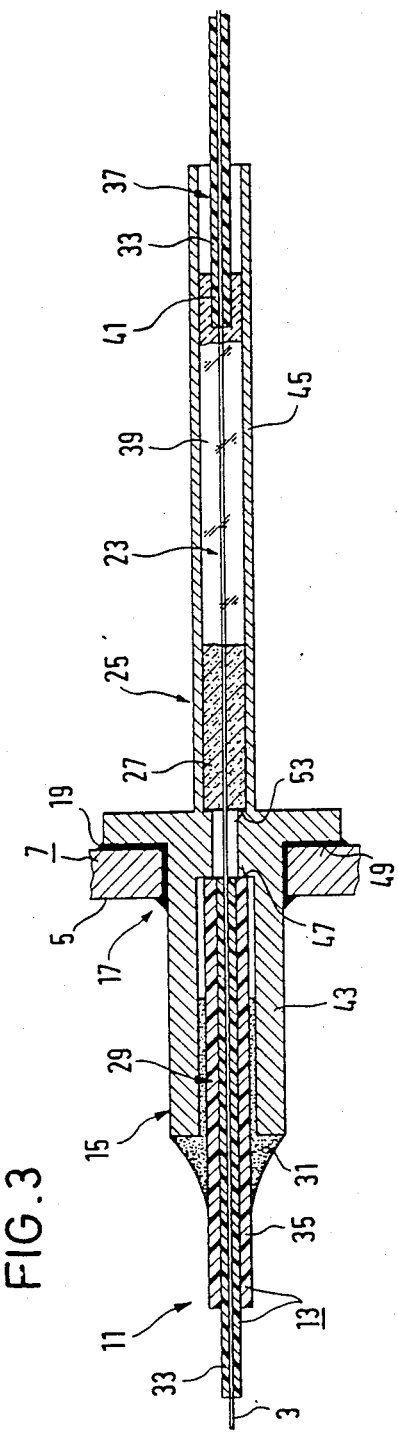
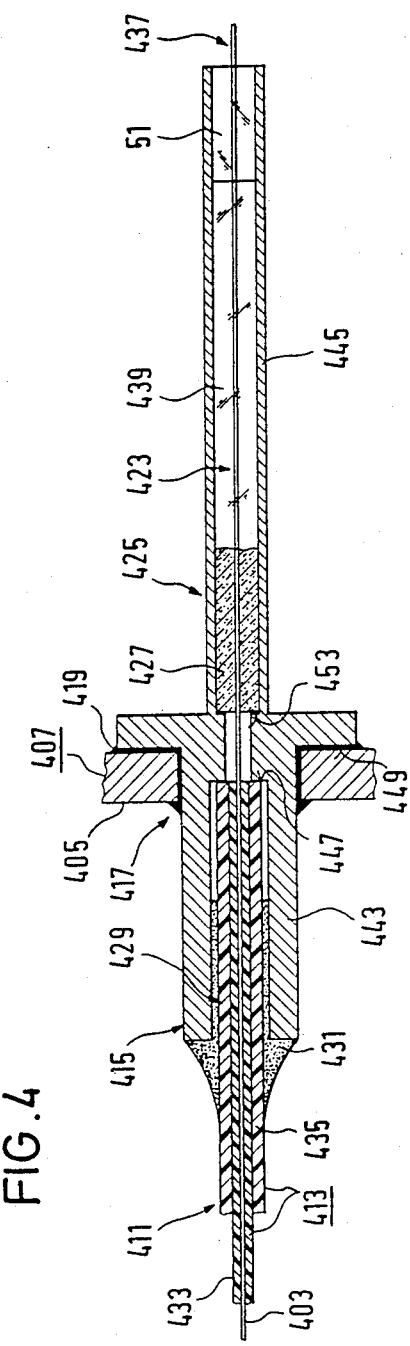
FIG.3
FIG.4

PROCESS OF AND APPARATUS FOR LEADING AN OPTICAL WAVEGUIDE THROUGH A WALL VIA A HERMETIC SEAL

BACKGROUND OF THE INVENTION

The invention relates to a process and a device for hermetically leading a preferably flexible optical waveguide made of glass, covered by a protective layer that is preferably multiple-ply and preferably of plastic, through a wall of a housing.

Often, an optical waveguide of glass must be led, hermetically sealed, through a metallic wall of a housing; the housing serves, for example, to seal hermetically optoelectronic components that must be protected from the effect of corrosive media, humidity and the like.

In a known device for the hermetic lead-through of an optical waveguide (DE 34 31 748), two lead-through elements are provided that must be attached in a sealed manner to the wall and to the optical waveguide respectively and then must be connected in a sealed manner to each other. That is complicated and timeconsuming, and entails a series of error possibilities.

With another known lead-through for an optical waveguide (U.S. Pat. No. 4,357,072), the exposed optical waveguide is metallized and soldered so as to be metallically sealed to the wall.

Metallization of a glass optical waveguide is expensive and can easily result in errors. Bending protection for the outgoing part of the optical waveguide is not accomplished with simplicity.

SUMMARY OF THE INVENTION

It is an object of this invention to provide a method of and a device for the hermetic lead-through of an optical waveguide that require minimal expense to achieve the desired properties of the lead-through structure, such as high reliability and seal integrity, high mechanical load capacity, freedom in the selection of wall material and an immovable geometry when being locked in position.

Upon further study of the specification and appended claims, further objects and advantages of this invention will become apparent to those skilled in the art.

In the device according to the invention there is made, by glass solder surrounded by a bushing, a mechanically protected seal that is resistant to even the most corrosive media and that exhibits the effective sealing and permanency typical of glass solders. Only simple parts and simple work steps are required, and even the time expenditure for the production of the lead-through is limited. Solder glass with relatively low processing temperatures below 700° C., e.g., about 450° C., can easily be used so that common heat sources, e.g., radiant heat from a heating coil or induction heating, suffice. Nor is it a problem, in the production of the glass solder, to cool the bushing, which normally consists of metal, in certain areas if necessary to avoid damage to the material of the protective layer.

The load-relieving section, in which the optical waveguide is attached by the protective layer to the bushing, assures continuous bending protection of the part of the optical waveguide emerging from the bushing.

In the most common case in which the optical waveguide has a multiple-ply protection layer, it suffices if the optical waveguide is provided, in a section emerging from the bushing into the housing interior, with only one innermost ply of the protective layer, it is even possible to completely delete the protective layer. In both cases, in the first sealing area provided for the glass solder, the bushing can have a very small inside diameter, so that only a little solder glass is needed so that the glass solder can be produced in a short time and with a small amount of heat and seals especially reliably. If necessary, the section of the optical waveguide emerging from the bushing into the housing interior can be centered in the bushing by an insert. In this way, damage to the optical waveguide in the area in which it emerges from the bushing can be prevented.

Preferably, the bushing is metallically soldered in the second sealing area to the wall of the housing. This results in a relatively simple, reliable and mechanically solid, hermetically sealed connection. As a rule, soft soldering suffices. To achieve soft soldering, the required temperatures are far below the processing temperature of the solder glass so that a harmful influence on the already produced glass solder is reliably prevented. Further, the bushing can be configured so that both sealing areas lie far apart from one another and, during soldering, desired areas of the bushing can be cooled. Of course, materials are selected for the bushings and the wall that are suitable for soldering. If necessary, suitable surface coatings are provided; but that is normally not necessary.

Preferably, a glass solder is provided that is under compressive prestress which results in an often desired higher resistance to mechanical and thermal loads. The amount of the compressive prestress can be selected or determined by selection of the materials used, however, it is, of course, also possible to select the materials so that the glass solder not under prestress.

BRIEF DESCRIPTION OF THE DRAWINGS

Various other objects, features and attendant advantages of the present invention will be more fully appreciated as the same becomes better understood when considered in conjunction with the accompanying drawings, in which like reference characters designate the same or similar parts throughout the several views, and wherein:

FIG. 3 shows, in a diagrammatic representation in longitudinal section, of the device according to FIG. 2 in the installed state; and FIG. 4 shows, in a representation similar to that of FIG. 3, another embodiment wherein parts that appear in corresponding form in FIGS. 1 to 3 are designated by the same reference symbols, but preceded by the numeral 4.

DETAILED DESCRIPTION

Figure 1:
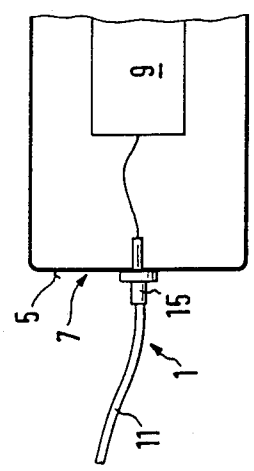
FIG. 1 demonstrates diagrammatically the use of a device according to the invention.
Figure 2:
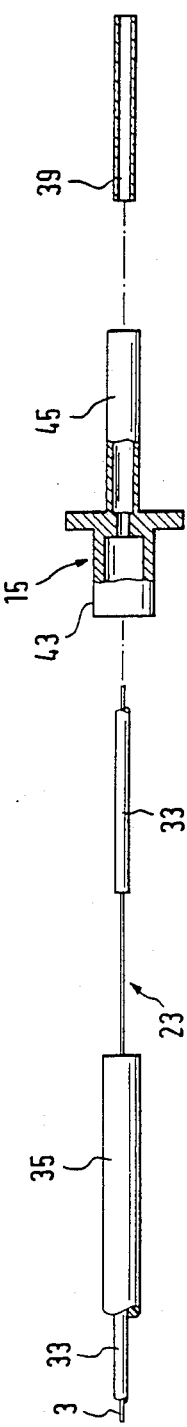
FIG. 2 is a diagrammatic, partially sectioned, exploded representation of a device according to the invention.

FIGS. 1 to 3 show a device 1 for hermetically leading a flexible optical waveguide 3 made of glass through a metallic wall 5 of a hermetically sealed housing 7, in which an optical waveguide 3 is connected to an optoelectronic device 9. Optical waveguide 3 is surrounded with a plastic protective layer 13 (FIG. 3) in a section 11 leading outward from device 1.

Device 1 includes a bushing 15 that is fastened in an opening of wall 5 and is sealed hermetically in a second sealing area 17 against wall 5, namely in the embodiment represented, by a metallic solder 31, preferably a soft solder.

Optical waveguide 3 is guided through bushing 15 and has a section 23 on the other side of the bushing which is free of the protective layer 13 in which section the optical waveguide 3 consisting just of glass is connected, while hermetically sealed, in a first sealing area 25 of bushing 15 by glass solder 27 to bushing 15. In a load-relieving section 29 that leads out of bushing 15 in an outward direction, optical waveguide 3 is attached by its protective layer 13 to bushing 15 by an adhesive joint 31 which may be, for example, made of UV thermosetting adhesive. This results in an insertion of the optical waveguide through wall 5 and into housing 7 that is protected from buckling as well as being otherwise completely protected. Toward the interior of housing 7, a strain relief is normally not necessary nor is it provided in the embodiment represented. However, it is often suitable to provide that portion of optical waveguide 3 inside the housing with a protective layer to prevent buckling, so that it can be run without special precautionary measures freely inside the housing. Of course, the radii of curvature must not become too small so as to minimize light losses.

In the embodiment according to FIGS. 1 to 3, plastic protective layer 13 is multiple-ply and contains a relatively thick outer ply 35. Section 37 of optical waveguide 3 emerging from bushing 15 into the interior of housing 7 is covered only by inner ply 33 which alone offers sufficient buckling protection. The use of only thinner inner ply 33 has the advantage that the inside diameter of bushing 15 in the second sealing area 25 can be correspondingly small and thus the amount of solder glass in glass solder 27 can be correspondingly limited.

In the embodiment represented, glass solder 27 applied to the housing-side end of bushing 15 continues into a solder glass pipe 39 that extends so as to provide a bending protection, unfused, to over an end section 41 of the protective layer. This provides a protected transition between section 23, free of the protective layer, and section 37 that is surrounded by a protective layer, but only by inner, thin ply 33, and that extends into the interior of housing 7. The optical waveguide protected this way can be run flexibly inside housing 7 without it being necessary to pay special attention to avoiding mechanical loads on the optical waveguide, e.g., by tensions due to thermal expansion.

Bushing 15 is represented as one piece and has, in an end section 43 that is to be oriented outward relative to housing 7, an inside diameter sized to receive protective layer 13 and, in an end section 45 to be oriented inward, a considerably smaller inside diameter, corresponding to the diameter of optical waveguide 3 which is present without protective layer 13 or only with an inner play 33 of the protective layer.

The bushing 15 can be prefabricated in a simple way, is very easy to use and needs only a small amount of solder glass to form the glass solder plug 27.

It is advantageous if bushing 15 includes at least one stop to limit the lead-in path of a part to be introduced to produce device 1. In this way, special measures for precise positioning of the part involved are not necessary; the part need be introduced only up to the stop. In the embodiment represented, such a stop 47 is provided for the end face of protective layer 13. Bushing 15 represented further has a stop 49 for its localization on wall 5. This facilitates correct insertion of the lead-through.

To prevent damage to protective layer 13 during soldering in sealing areas 19 and 25, a sufficient distance is provided between protective layer 13 and sealing areas 19 and 25, especially to first sealing area 25, where relatively high temperatures occur during glass soldering.

FIG. 4 shows an embodiment in which, on section 37 of optical waveguide 403 leading to the housing interior, no protective layer 413 is provided. This simplifies production of the lead-through. When there are short running lengths of the waveguide inside housing 7, a protective layer is nonessential inside the housing. However, it may be advantageous to provide, on the housing-side end of bushing 415, a centering insert 51.

The production of the device according to the invention is simple. A section 23 (or 423) of optical waveguide 3 (or 403) is freed of protective layer 13 (or 413) and carefully cleaned. In the embodiment according to FIGS. 2 and 3, there is left on end section 37 adjoining it and leading into the housing interior, a thin, innermost ply 33 of protective layer 13; in the embodiment according to FIG. 4, no protective layer at all is provided at that location. Prefabricated bushing 15 (or 415) is then, after careful cleaning, pushed with outer-side end section 43 (or 443) forward onto optical waveguide 3 (or 403) until the face end of protective layer 13 (or 413) lies against stop 47 (or 447).

The solder glass required can have been introduced in advance as a paste on section 23 (or 423) or into housing-side end section 45 (or 445). But handling is simpler and the amount of solder glass made available is more precisely specified, if the solder glass is provided in the form of a solder glass pipe 39 (FIGS. 2 and 3) or 439 (FIG. 4) which, before or after introduction of the optical waveguide, is introduced into housing-side end section 45 (or 445) of bushing 15 (or 415). In the embodiment represented, a stop 53 (or 453) is provided in the bushing for this purpose.

Then, by warming bushing 15 (or 415) near first (glass solder) sealing area 25 (or 425), an inner end section of solder glass pipe 39 (or 439) is fused with optical waveguide section 23 (or 423) and bushing 15 (or 415). This hermetically connects the optical waveguide to the bushing. The rest of solder glass pipe 39 or 439 remains as a buckling protection.

Next, bushing 15 (or 415) is inserted into the opening provided for it in wall 5 (or 405) and is hermetically connected to the wall, e.g., as described, by a metallic soft solder. The temperatures required for it, e.g., with a SnPb solder, about 200° to 230° C., are sufficiently below the processing temperature of solder glass of, e.g., 450°, to prevent a harmful effect on the already produced glass solder 27 (or 427).

Next or at another suitable time, protective layer 13 (or 413) is connected with the bushing on the end of the bushing away from the housing, e.g., as described, by an adhesive joint 31 (or 431).

After producing the desired attachment, housing 7 can be hermetically closed, e.g., by a roof wall being soldering on (not shown).

To achieve a tight and robust glass solder plug 27 (or 427), it is preferable to use a solder glass pipe 39 (or 439) that fills as completely as possible the space between optical waveguide section 23 (or 423) and bushing 15 (or 415). In the embodiment according to FIGS. 2 and 3, the inside diameter of solder glass pipe 39 must be large enough so that the solder glass pipe can be pushed over remaining inner ply 33 of protective layer 13.

Therefore, it is preferable to select this innermost ply so as to be thin as possible, without seriously disturbing the protective function of the optical fiber.

Preferably, innermost ply 33 should have a thickness less than about 20 microns. It can be seen from FIG. 3 that solder glass pipe 39 has sufficient length to extend over an end section of the housing-side protective layer which is formed by the innermost ply 33, and therefore provides bending protection. A similar situation occurs in the embodiment according to FIG. 4, in which no protective layer is provided in this area.

Solder glass pipe 39 (or 439) can, is necessary, also be positioned with longitudinal spacing to make it easier to place it in optical waveguide section 23(or 423). In any case, the use of a solder glass pipe 39 (or 439) offers the advantage that a precise, positioned introduction of an amount of solder glass is possible without having to provide a lateral filling opening for solder glass on bushing 15 (or 415). Instead, the bushing is closed over its periphery. This is not only mechanically simpler, but also contributes distributing the glass solder evenly everywhere.

So that the finished glass solder is to be as free as possible of mechanical tension, materials used for the bushing and the solder glass have about the same linear thermal expansion coefficients as the optical waveguide.

If, on the other hand, in the finished glass solder a mechanical compressive prestress is to be present, by which the resistance to mechanical loads can be increased, materials are used for the bushing and the solder glass having linear thermal expansion coefficients $a_D$ or $a_G$ that are suitably different from the expansion coefficients $a_L$ of the optical waveguide, in particular $a_D > a_G > a_L$.

The entire texts of all applications, patents and publications, if any, cited above and below, and of corresponding application German No. P 38 07 491.5, filed Mar. 8, 1988, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. An improvement in apparatus for hermetically leading a flexible optical waveguide (3; 403) made of glass, covered by a multiple-ply protective layer (33; 433) through a wall (5; 405) of a housing (7; 407) into the interior of the housing; wherein according to the improvement the optical waveguide (3; 403) is retained in a bushing (15; 415), has a first section (23; 423) free of the protective layer (33; 433) and a first sealing area (25; 425) which is connected with a hermetic seal to the bushing by glass solder (27; 427); the waveguide further having a load-relieving section (37; 437) leading out of the bushing (15; 415) and being fastened by fastening means (41; 51) to the bushing (15; 415), the bushing (15; 415) extending through a wall (5; 405) of the housing (7; 407); having a portion adjacent the housing sealed in a second sealing area (17; 417) hermetically against the wall and having a first section extending into the housing and terminating as a free end within the housing, the optical waveguide being surrounded in a first section (37; 437) extending from the bushing into the housing interior by at least one inner ply (33; 433) of the multiple-ply protective layer (13; 413); a glass solder seal (27; 427) extending from the portion of the bushing adjacent the housing in an elongated solder glass pipe (39; 439) in which the optical waveguide is guided, the solder glass pipe (39; 439) providing via an end section at the portion of the brushing adjacent the inner surface of the wall of the bushing, protection from bending for the optical waveguide (3; 403).

2. The improvement according to claim 1, wherein the load relieving section (37; 437) of the optical waveguide (3; 403) emerging from bushing (15; 415) into the interior of housing (7; 407) is centered in the bushing by the elongated solder glass pipe (39; 439).

3. The improvement according to claim 1, wherein the second sealing area (17; 417) uses metallic solder to metallically solder the bushing (15, 415) to the wall (5; 405).

4. The improvement according to claim 1, wherein between the protective layer (13; 413) and the first sealing area (25; 425) a space (53; 452) is provided of sufficient distance to prevent damage to the protective layer (13; 413) when soldering (27; 427) is performed in the first sealing area (25; 425).

5. The improvement according to claim 1, wherein the glass solder (27; 427) is essentially free of mechanical tension.

6. The improvement according to claim 1, wherein the glass solder (27; 427) is under compressive prestress.

7. A process for accomplishing the improvement of claim 1, the process comprising the steps of removing the protective layer (13; 413) from a portion (23; 423) of the optical waveguide (3; 403) to provide an uncovered length (23; 423) of waveguide (3; 403); placing the uncovered length (23; 423) of waveguide (3; 403) together with the solder glass (27; 427) in the fifst section (25; 425) of the bushing (15; 415) which extends into the housing (5); hermetically sealing the uncovered length (23; 423) of waveguide within the first section (25; 425) of the bushing (15; 415) by heating areas of the bushing (15; 415) contained the uncovered length of waveguide to fuse the solder glass (27; 427) to the bushing (15; 415) and waveguide; attaching a portion (37; 437) of the waveguide (3; 403) having the protective layer thereon to the first section (25; 425) of the bushing (15; 415) adjacent to the free end of the first section (25; 425) and adhering (19; 419) the bushing (15; 415) hermetically to the wall (5; 405) of the housing.

8. The process according to claim 1, wherein the solder glass pipe (39; 439) is filled as completely as possible, filling any space between optical waveguide (3; 403) and bushing (15; 415).

9. The process according to claim 7, wherein materials are used for the bushing (15; 415) and the solder glass pipe (39; 439) that have about the same linear thermal expansion coefficients as the optical waveguide (3; 403).

10. The process according to claim 7, wherein materials are used for the bushing (15; 415) and the solder glass pipe (39; 439) which have linear thermal expansion coefficients which are different from those of the optical waveguide (3; 403) such that there is a compressive prestress in the finished glass solder (27; 427).

11. The process according to claim 7, wherein the bushing (15; 415) is sealed hermetically in the second sealing area (17; 417) to the wall (5; 405) by metallic solder.

12. A bushing for utilization with the apparatus according to claim 1, wherein the bushing (15; 415) is unitary and, in an end section (43; 443) to be oriented outward relative to housing (7; 407), the bushing (15;

415) has an inside diameter sized to receive the protective layer (13) and, in an end section (45; 445) oriented inward, the bushing (15; 415) has a smaller inside diameter to receive a section of optical waveguide (3; 403) freed of at least one ply (35) of protective layer (13).

13. The bushing according to claim 12, wherein the bushing (15; 415) includes at least one stop (47; 53; 447; 453) for limiting the lead-in path of the optical waveguide introduced through the bushing.

14. The bushing according to claim 12, wherein the bushing has a flange (49; 449) for engaging the wall (5; 405).

15. The bushing according to claim 12, wherein the bushing (15; 415) is closed over the periphery thereof.

* * * * *